United States Patent
Bhat et al.

(10) Patent No.: US 10,392,747 B2
(45) Date of Patent: Aug. 27, 2019

(54) SYSTEM AND A METHOD FOR OPTIMIZATION OF CONTINUOUS DIGESTION PROCESS

(75) Inventors: Shrikant Bhat, Nagpur (IN); Babji Buddhi Srinivasa, Bangalore (IN); Prasanna Pathath, Bangalore (IN)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 13/209,802

(22) Filed: Aug. 15, 2011

(65) Prior Publication Data

US 2012/0048492 A1    Mar. 1, 2012

Related U.S. Application Data

(63) Continuation of application No. PCT/IB2009/007841, filed on Dec. 22, 2009.

(30) Foreign Application Priority Data

Feb. 13, 2009  (IN) .............................. 317/CHE/2009

(51) Int. Cl.
*G05B 13/04*    (2006.01)
*G05B 13/02*    (2006.01)
(Continued)

(52) U.S. Cl.
CPC ................. *D21C 7/12* (2013.01); *D21C 7/00* (2013.01); *G05B 13/0265* (2013.01); *G05B 13/042* (2013.01)

(58) Field of Classification Search
CPC .................................... D21C 7/00; D21C 7/12
(Continued)

(56) References Cited

U.S. PATENT DOCUMENTS 4,752,357 A    6/1988 Baker
5,301,102 A    4/1994 Maras et al.
(Continued)

FOREIGN PATENT DOCUMENTS

DE    19 653 532 A1    6/1998
EP    1 528 148 A2    5/2005
WO    WO 1998/028487 A1    7/1998

OTHER PUBLICATIONS

Doyle III et al., Reaction profile control of the continuous pulp digester, 1999, Chemical Engineering Science, 54, pp. 2679-2688.*
(Continued)

*Primary Examiner* — Anthony Calandra
(74) *Attorney, Agent, or Firm* — Barnes & Thornburg LLP

(57) ABSTRACT

A method is disclosed for optimization of continuous digestion process. Exemplary embodiments can control a delignification process in a continuous pulp digester in an optimal way for different pulp grades taking into account process disturbances and model uncertainties. This can be achieved by customizing a generic mathematical model for a continuous digestion process which runs through a software application on a dedicated electronic device. The model can be updated periodically based on on-line information, and used with a plant optimization component involving multi-objective optimization to evaluate optimal set points for the controllers. A system is also disclosed for optimizing control of a continuous pulp digester.

3 Claims, 3 Drawing Sheets

(51) Int. Cl.
*D21C 7/12* (2006.01)
*D21C 7/00* (2006.01)

(58) Field of Classification Search
USPC .......................................................... 162/61
See application file for complete search history.

(56) References Cited

U.S. PATENT DOCUMENTS

| | | | |
|---|---|---|---|
| 6,447,639 B1 | 9/2002 | Warren et al. | |
| 7,082,348 B1 * | 7/2006 | Dahlquist | G05B 13/048 |
| | | | 162/232 |
| 2005/0034824 A1 | 2/2005 | Lampela | |
| 2005/0071137 A1 | 3/2005 | Selvaraj et al. | |
| 2009/0250180 A1 * | 10/2009 | Kivekas | D21C 3/228 |
| | | | 162/49 |
| 2012/0053720 A1 * | 3/2012 | Mathur | D21C 11/12 |
| | | | 700/104 |

OTHER PUBLICATIONS

Persson et al., P2:Pulp Production Planning, Apr. 2002, ABB Review, p. 39-43.*
International Search Report (PCT/ISA/210) dated Apr. 27, 2010, by Indian Patent Office as the International Search Authority for International Application No. PCT/IB2009/007841.
International Preliminary Report on Patentability (PCT/IPEA/409) dated May 27, 2011, by Indian Patent Office as the International Searching Authority for International Application No. PCT/IB/2009/007841.
Padhiyar et al., "Nonlinear inferential multi-rate control of Kappa number at multiple locations in a continuous pulp digester", 2006, pp. 1037-1053.

* cited by examiner

SYSTEM AND A METHOD FOR OPTIMIZATION OF CONTINUOUS DIGESTION PROCESS

RELATED APPLICATIONS

This application claims priority as a continuation application under 35 U.S.C. § 120 to PCT/IB2009/007841, which was filed as an International Application on Dec. 22, 2009 designating the U.S., and which claims priority to Indian Application 317/CHE/2009 filed in India on Feb. 13, 2009. The entire contents of these applications are hereby incorporated by reference in their entireties.

FIELD

The present disclosure relates to optimization of a continuous pulp digester for the pulp and paper industry. Exemplary embodiments are directed to controlling a delignification process in a continuous pulp digester in an optimal way for different pulp grades taking into account process disturbances and model uncertainties.

BACKGROUND INFORMATION

Continuous pulp digesters in the pulp and paper industry are used for cooking wood chips to produce pulp which in turn is used for making paper. The aim of cooking is to remove the lignin component present in the wood chips. Lignin is a complex compound present in the wood and acts as a binding material for the cellulose fibers. Wood chips along with the cooking liquor are fed continuously at the top of the digester and the cooked wood chips are removed as pulp product from the bottom of the digester unit. In the dual vessel configuration, the impregnation process is carried out in a separate vessel followed by another vessel containing (e.g., consisting of) upper, lower and washing sections. In general, the cooking process involves removal of lignin from the wood chips by the cooking liquor. During cooking in the continuous pulp digester, the chips always flow top-down, while the flow of the cooking liquor is either co-current or countercurrent for various sections involved. The heat used for cooking is provided by heating the cooking liquor by taking out and recirculating it back. Part of the liquor after extracting the wood components is taken out for further processing. Because of the complex nature of this process, a continuous pulp digester is characterized by highly nonlinear behavior. This, in addition to factors such as presence of long dead time, strong interactions between the process variables, and unmeasured changes in the characteristics of the wood chips, can make the control of digester very difficult.

The digester system has process parameters, such as model states with a particular concentration of one or more components in solid, liquid and gas phase, temperatures, pressures, flow rates of the white liquor and wash liquor, the recirculation flow rates and temperatures, the flow rate of the steam in the heat exchangers, effective alkali and active alkali of white liquor and wash liquor, etc.; quality parameters such as kappa number, consistency, pulp strength, effective alkali and active alkali of the extraction streams, etc.; performance parameters such as energy efficiency, yield, inventory consumption and operating cost, etc.; and model parameters such as reaction rate coefficients, effectiveness factors, diffusion and heat transfer coefficient. All of these parameters (i.e., process parameters, quality parameters, performance parameters and model parameters) are collectively referred to as digester parameters herein.

A known practice in the paper industry is to specifically control the kappa number of the pulp at the bottom outlet or blowline of the digester by manipulating the temperature of circulating cooking liquor flows at different sections and flow rates of make-up white liquor and wash liquor to different sections of the digester. The set-points for temperatures and flow rates of white liquor/wash liquor are adjusted based on operator experience in an ad-hoc fashion. However, recently, multivariable model predictive control strategies have also been proposed to improve the control of the digester. Patents and publications related to control of processes in a digester are as follows:

U.S. Pat. No. 5,301,102 describes the use of step response models and periodic measurements of kappa number and effective alkali of cooking liquor to control the kappa number of pulp produced from a Kamyr digester.

US Publication No. 20050034824 uses a method based on on-line analyzers, dead time compensators, decouplers and a look up table (similar to fuzzy logic rules) of the effect of various manipulated variables on digester quality and performance parameters to achieve desired performance of the digester.

U.S. Pat. No. 6,447,639 relates to the application of heat and ion mobility spectrometry to calculate an amount of cooking liquor added based on the on-line determination of characteristics of chips being fed into the pulp digester.

U.S. Pat. No. 4,752,357 describes a method for determining a degree of cooking to which pulp has been in the digestion process. This can be very useful to establish appropriate predictive control action.

Other known methods reported in the literature deal with application of techniques such as model predictive control using linear and nonlinear models, inferential control, and optimization of the operating conditions to produce pulp of a desired kappa number from a continuous pulp digester.

Continuous pulp digester simulation models of different complexities have also been reported for different applications such as monitoring and control. Recently, Padhiyar et al., (2006) proposed some strategies which aim at controlling the Kappa number profile at various cooking zones of the digester, instead of just controlling it at the blow line. This could facilitate faster process disturbance rejection as corrective action will be initiated much earlier than the consequences are manifested on the Kappa number in the blow line. Such a distributed control strategy will also promote faster and efficient transient operation during grade change. However, the strategy is limited to the proposal of using the kappa number profile, and does not extend to teach how to assign optimal set-points for various controllers. As discussed earlier, assigning set-points has been based on operator experience.

To summarize, known reported approaches are mainly focused on controlling the Kappa number only in the blow line section and on further improvements by controlling the profile of various selected properties like the Kappa number and yield along a length of the digester as well.

The control of the profile should be done optimally to ensure various objectives of the plant such as superior quality and performance, and processes are controlled on-line to meet specifications as desired. However, the control of the profile should be addressed at one or more levels during the continuous digestion process corresponding to one or more sections involved therein during the process. The optimization and control with more than one quality parameter or performance parameter or process parameter involves some ability to deal with the complexities of the plant process, optimization problem formulation and trade offs involved in dealing with conflicting specifications. Exemplary embodiments as disclosed herein are directed to addressing this aspect.

SUMMARY

A system is disclosed for optimizing control of a continuous pulp digester, comprising:
  a) a process model component with a process model of at least one of plural sections of the continuous pulp digester;
  b) a parameter estimation component to provide estimates of one or more digester parameters for at least one section of the continuous pulp digester;
  c) a plant optimization component to perform computations for optimization of the one or more digester parameters using the process model component and the parameter estimation component of the continuous pulp digester, the plant optimization component including a plant objective function to perform on-line optimization of digester parameters formulated from plural parameter objective functions; and
  d) one or more controllers for regulating the digester parameters at least one of the plural sections of the continuous pulp digester and for receiving a setpoint from the plant optimization component.

A method is also disclosed for on-line optimization of a continuous pulp digester, the said method comprising:
  a) providing a process model of at least one of plural sections of the continuous pulp digester by a process model component;
  b) obtaining estimates of one or more digester parameters for at least one of the plural sections of the continuous pulp digester by a parameter estimation component;
  c) obtaining measured data using at least one of on-line measurements, data from laboratory analysis, and/or any combination thereof;
  d) obtaining a difference between the estimates of the digester parameters and the measured data obtained using on-line measurements, data from laboratory analysis and/or any combination thereof;
  e) obtaining optimized digester parameters with parameter objective optimization and/or plant objective optimization based on the difference; and
  f) regulating the digester parameters by one or more controllers at least one of the plural sections of the continuous pulp digester using the optimized digester parameters as setpoints for optimized control of the continuous pulp digester.

BRIEF DESCRIPTION OF THE DRAWINGS

The appended drawings illustrate exemplary embodiments of this invention and are not to be considered as limiting of its scope, as the invention encompasses other equally effective embodiments. In the drawings.

DETAILED DESCRIPTION

Figure 1:
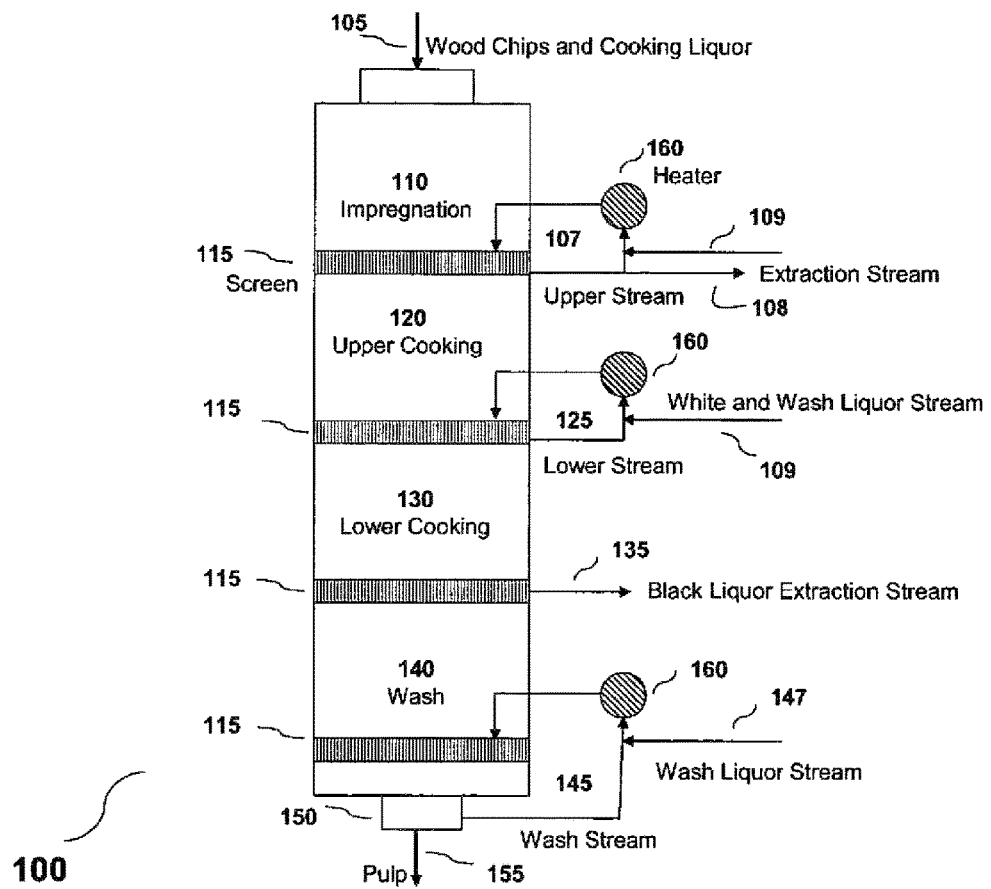
FIG. 1 is a schematic of a continuous pulp digester process.

Exemplary embodiments as disclosed herein are directed to optimization of a continuous pulp digester with respect to various digester parameters.

A method is disclosed to provide optimal set-point profiles for one or more digester parameters along a digester length based on real time plant data.

A multiobjective optimal solution profile can be evaluated for the continuous pulp digester.

In addition, a single objective optimization can be evaluated to arrive at optimal set points.

Model parameters can be updated using a parameter estimation component.

A desired solution of the multiobjective optimization can be used as an initial guess for the single objective optimization problem to ensure online multiobjective operations.

Accordingly, the present disclosure relates to an optimization of continuous pulp digester parameters by evaluating optimal set-point profiles for digester parameters along multiple sections of the digester. A single objective optimization problem can be formulated using results of the multiobjective optimization based on desired quality specifications. The single objective optimization problem so formed can involve optimization of one of the objectives and the equality constraint on other objectives corresponding to the selected multiobjective optimal solution.

The digester model can be continuously updated using the online data and results from a laboratory. The updated model can be used to periodically carry out single objective optimization to update the optimal set point profile. For a significant deviation in model predictions, the multiobjective optimization can also be repeated to arrive at updated multiobjective optimal solutions.

In an exemplary embodiment, a system is disclosed for optimizing control of a continuous pulp digester. The system comprises:
  a) a process model component with a process model of at least one of many sections of a continuous pulp digester;
  b) a parameter estimation component to provide estimates of one or more digester parameters for at least one of the many sections of the continuous pulp digester;
  c) a plant optimization component to perform computations for optimization of the one or more digester parameters using the process model component and the parameter estimation component of the continuous pulp digester, the plant optimization component including a plant objective function to perform on-line optimization of digester parameters formulated from plural parameter objective functions; and
  d) one or more controllers for regulating the digester parameters at least one of the many sections of the continuous pulp digester and provided with a setpoint by the plant optimization component, wherein the plant optimization component includes a plant objective function to perform on-line optimization of digester parameters formulated from plural parameter objective functions.

In an exemplary embodiment, the parameter estimation component can comprise of one or more modules such as:
  a) a prediction module to provide an estimate of one or more digester parameters containing (e.g., consisting of) model parameters, process parameters, and quality and performance parameters by using methods such as on-line measurement, data from laboratory analysis, mathematical formulation and/or any combinations thereof;

b) an update module to update a process model component based on a significance of difference between estimates of one or more digester parameters and the measured data obtained using methods such as on-line measurements, data from laboratory analysis and/or any combination thereof;

c) a trigger module to trigger an optimization solver to compute plant objective function and parameter objective functions; and d) an interface support module to support a plant goal interface and provide consequence and state information including plant trajectory information to help choose a suitable plant objective function.

In another exemplary embodiment, a parameter estimation component of the system for optimizing control of a continuous pulp digester can be an integral part of the process model component or an integral part of the plant optimization component.

In yet another exemplary embodiment, a system for optimizing control of a continuous pulp digester can have a plant optimization component with at least one plant objective function.

In yet another exemplary embodiment, one of the many sections of the continuous pulp digester can be formed in one or many combinations of the zones such as in an impregnation zone, upper cooking zone, lower cooking zone, and/or wash zone of the continuous pulp digester, wherein the one of the many sections is contained in one or more units.

In yet another exemplary embodiment, the plant optimization component has a plant goal interface used at one or multiple phases of plant operation to obtain preference information using an user interface or using a software interface to obtain configuration data, or using a rule based system to seek and analyze information such as priority information for optimization of the one or more digester parameters, desired range and operating point.

In a second exemplary aspect, a method is disclosed for parameter objective optimization. The method can comprise:

a) providing a process model of at least one of many sections of the continuous pulp digester by a process model component;

b) obtaining estimates of one or more digester parameters for at least one of the many sections of the continuous pulp digester by a parameter estimation component;

c) obtaining measured data using means such as processors for receiving on-line measurements, data from laboratory analysis and/or any combination thereof;

d) obtaining a difference between estimates of the digester parameters and measured data obtained using methods such as on-line measurements, data from laboratory analysis and/or any combination thereof;

e) obtaining optimized digester parameters with parameter objective optimization and/or plant objective optimization based on the difference; and f) regulating the digester parameters by one or more controllers at least one of the many sections of the continuous pulp digester using the optimized digester parameters as setpoints for optimized control of the continuous pulp digester.

In another exemplary embodiment, the plant objective optimization can comprise:

a) selecting a plant objective function from a plurality of parameter objective functions through preference information obtained from a plant goal interface;

b) obtaining a process model and digesters parameters from a parameter estimation component;

c) obtaining constraint and bound information for the plurality of parameter objective functions except for the selected plant objective function defined using the plant goal interface; and d) optimizing the plant objectives function under constraints imposed by the process model or the constraints and bounds from the plant goal interface or both the constraints imposed by the process model and the constraints and bounds from the plant goal interface by manipulating the digester parameters to obtain optimal values of the plant objective function.

In accordance with another exemplary embodiment, the parameter objective optimization can comprise:

a) obtaining a process model and digester parameters from a parameter estimation component;

b) providing constraints and bounds for the digester parameter using a plant goal interface;

c) defining one or more parameter objective functions with digester parameters from the parameter estimation component and the constraints and bounds from the plant goal interface; and d) optimizing the one or more parameter objective functions under constraints imposed by the process model or the constraints and bounds from the plant goal interface or both the constraints imposed by the process model and the constraints and bounds from the plant goal interface by manipulating the digester parameters to obtain one or more optimal values of the parameter objective functions.

In yet another exemplary embodiment, the obtaining of optimized digester parameters can include suitably updating the process model component, and/or suitably triggering a parameter optimization component and/or plant optimization component by performing on-line optimization of the digester parameters, the suitability of the updating of the process model component and the triggering of the parameter optimization component being based, for example, on allowed tolerances of on-line performance and accuracy of the continuous pulp digester plant.

With reference to the drawings, various steps involved in a continuous digestion process control and system for optimal control will now be described.

Two types of digester configurations, single or dual vessel, are used for continuous pulp digesters in the industry. A single vessel continuous pulp digester is a vertical cylindrical vessel containing (e.g., consisting of) different zones such as impregnation, upper cooking, lower cooking and wash zones. FIG. 1 illustrates an exemplary schematic of a continuous digester unit 100, containing (e.g., consisting of) a single vessel. The aspects of the single unit continuous pulp digester may also be represented with multiple digester units containing (e.g., consisting of) more than one vessel.

An exemplary digester unit chemically treats wood chips under increased temperature and pressure to reduce the lignin content of the pulp suitable for papermaking. The wood chips and the cooking liquor stream 105 enters the digester unit at the top and travels downwards through various zones such as impregnation zone 110, upper cooking zone 120, lower cooking zone 130, and wash zone 140, before leaving the digester bottom through the blow line 150 as pulp 155.

The digester can operate as a three-phase solid-liquid-gas reactive system. The solid mass in the chips decreases as pulping proceeds through delignification creating water soluble solids that dissolve in the entrapped liquor. The water soluble solids are suitably transferred to the free liquor surrounding the pulp phase by the diffusion process.

In the impregnation zone 110, cooking chemicals continue to diffuse into the liquid entrapped in the void spaces of the chips. The temperature in the impregnation zone may not be high enough to cause an appreciable rate of delignification to occur and at different zones, the temperature is maintained through use of many heaters 160, for the individual zones. Upon leaving the impregnation zone, the chips and cooking liquor enter an upper cooking zone 120, where the temperature is usually raised by an externally heated upper cooking circulation stream 107. Cooking liquor is partly withdrawn from the upper cooking zone as upper extraction stream 108, and partly heated in an external heater 160, and circulated back into the upper cooking zone. Make up white liquor and wash liquor stream 109, is added to the circulation stream before it passes through the heater 160.

After upper cooking zone 120, chips and cooking liquor enter the lower cooking zone 130, where the cooking liquor stream 125, is circulated through an external heater 160, to maintain the temperature. Make-up white liquor and wash liquor stream 109, is also added to the circulating liquor before entering the heater. At the end of the lower cooking zone, part of the cooking liquor is removed as black liquor extraction stream 135.

After lower cooking zone, the pulp enters the wash section 140, where it is mixed with wash liquor to remove the reacted lignin from the pulp. Some amount of delignification reaction occurs in this zone also. The circulating liquor stream 145, from the wash section is also heated in an external heater 160. Make-up wash liquor stream 147, is added to this stream before entering the heater. This helps in achieving further delignification reaction in wash zone. The cooked pulp is removed through the blowline 150, from the bottom of the digester and sent to the brown stock washing section of the mill (not shown in the figure). The extraction as well as circulation streams are withdrawn from the digester through screens 115.

A control system is deployed around the digester 100 to measure, manipulate and control the various digester parameters. The control system can be a distributed control system (DCS) with regulatory controllers. The control is exercised at various sections formed as a combination of one or multiple zones. The multiple zones can carry out similar functions, if any, and any multiple zones carrying out slightly different functions may be clubbed together to form a section.

Advanced control system modules can used for optimization. The optimization methods can be based on a process model. The model described herein can be a semi-empirical model. However, other models based on first principle or empirical methods may also be used. The following paragraphs describe model formulation and estimation of various model parameters. Model parameters are the parameters that are used for formulation of model equations.

The continuous pulp digester can be modeled as a tubular reactor which has one input for the feed chips, and cooking liquor enters at multiple locations in the various zones to carry out digestion. The temperatures and concentrations are, for example, assumed to vary along the length of the digester (from top to bottom) through various zones or sections of the digester.

A lumped parameter approach can be used for modeling the digester and the entire digester model can be built by representing it as a series of interconnected CSTR's (continuous stirred tank reactors). The wood and the liquor composition is assumed (e.g., specified) and material and energy balance for each of the components entering and leaving the CSTR is carried out to derive model equations. The reaction rate equations are considered to account for the consumption/formation of various components.

The entire exemplary digester can be divided into four major sections: impregnation section, upper cooking section, lower cooking section and wash section. Each section is assumed to be a series of CSTRs as described above. For each section a sub-model is developed and these are connected accordingly for developing a model for any type of digester. The model equations for each CSTR can be of the following generic form:

$$V\frac{dC_i}{dt} = F_i^{in} - F_i^{out} + F_i^{reaction}; i = 1 \text{ to } m; \quad (Eq\ 1)$$

$$\rho_s C_{p,s} V_s \frac{dT_{solid}}{dt} = H_{solid}^{in} - H_{solid}^{out} + H^{reaction} + H_{liquor \rightarrow solid}^{transfer}; \quad (Eq\ 2)$$

$$\rho_l C_{p,l} V_l \frac{dT_{liquor}}{dt} = H_{liquor}^{in} - H_{liquor}^{out} - H_{liquor \rightarrow solid}^{transfer}; \quad (Eq\ 3)$$

Eq. 1 describes the rate of accumulation of component i in the CSTR. $C_i$ is the concentration of the component i in CSTR. $T_{solid}$ and $T_{liquor}$ are the temperatures of the solid (chips) and the free liquor. $F_i^{in}$ and $F_i^{out}$ are the flow rates of component i in and out of the CSTR respectively, and $F_i^{reaction}$ represents the rate of formation of component i by reaction in the CSTR. m is the total number of components existing in various digester inlet/outlet streams and V is the volume of the CSTR. Eq. 2 and Eq. 3 describe the heat balance for the solid and the liquor phases. $H_{solid}^{in}$, $H_{solid}^{out}$, $H^{reaction}$, $H_{liquor \rightarrow solid}^{transfer}$ respectively represent the Rate of heat entering and leaving along with the solids for a CSTR, heat contribution due to reaction in the CSTR, and the heat transfer from liquor to solid phase. $H_{liquor}^{in}$ and $H_{liquor}^{out}$ represent the heat entering and leaving out of the CSTR through liquor phase. $\rho_s$ and $\rho_l$ are densities, $C_{ps}$ and $C_{pl}$ are specific heats and $V_s$ and $V_l$ are the volumes of the solid and liquor phases, respectively. The kinetic and diffusion parameters are incorporated in the term $F_i^{reaction}$ while the diffusion and heat transfer terms are incorporated in the term $H_{liquor \rightarrow solid}^{transfer}$. These are the various model parameters. A more generic form will incorporate momentum balance equation as well (not reported here). For a steady state model, the left hand side terms of Eqs. 1-3 will be zero.

The formulated model is tuned and validated using the plant data. In order to validate the model, model parameters are determined by minimizing the error between the actual offline plant measurements (measurements obtained from distributed control system as well as laboratory) and model predictions. Stochastic or linear or nonlinear gradients based optimization techniques can be used to minimize the error. The validated model is then used in the optimization framework.

The process model is formulated to represent process parameters such as various inputs, extraction and circulation flows and their compositions, temperatures, etc. It also includes quality parameters such as kappa number, plant consistency and emission factors and performance parameters such as yield, and operating cost. These parameters along with the model parameters are referred to as digester parameters. It is recognized that the optimization need can be for multiple digester parameters and hence multiple parameter objective functions are formulated.

The validated model is first used for solving the multi-objective optimization problem. A general statement of the multiobjective optimization problem involving "n" objectives is given by:

$$\operatorname*{Min/Max}_{u} \varphi_j(u, x, y) \; j = 1 \text{ to } n;$$

Subject to: Model equations

Constraints and bounds on u, x and y where, $\varphi_j$ is the $j^{th}$ objective function u is a vector of input variables, x and y are vectors of state and output variables.

The optimization problem with multiple objectives are expected to be conflicting for some objectives and this will result in a set of equally good solutions called non-dominated or Pareto optimal solutions which are distributed in the multiobjective optimal dimension space (with dimension of that of total number of objectives).

The solutions from the multi-objective optimization problem are reduced to a single objective optimization problem depending on the definition of plant goal function through a plant goal interface. The single objective function thus obtained is referred to as plant objective function as this function guides the plant to meet its objectives in totality in a most optimized manner. The multi-objective optimization functions are referred to as parameter objective functions.

The plant goal interface is a user interface that prompts the users with multiple solutions obtained by solving the multi-objective optimization problem formulated to optimize various digester parameters. The plant operator or manager is supported with the consequence information for each of the offered solutions on various digester parameters. The consequence information is obtained through use of the validated process model to predict the state of the plant with a particular choice of solution. The process of obtaining a choice may also be automated through use of configuration files or through a rule-based system that defines conditions to exercise choice for the plant.

Figure 2:
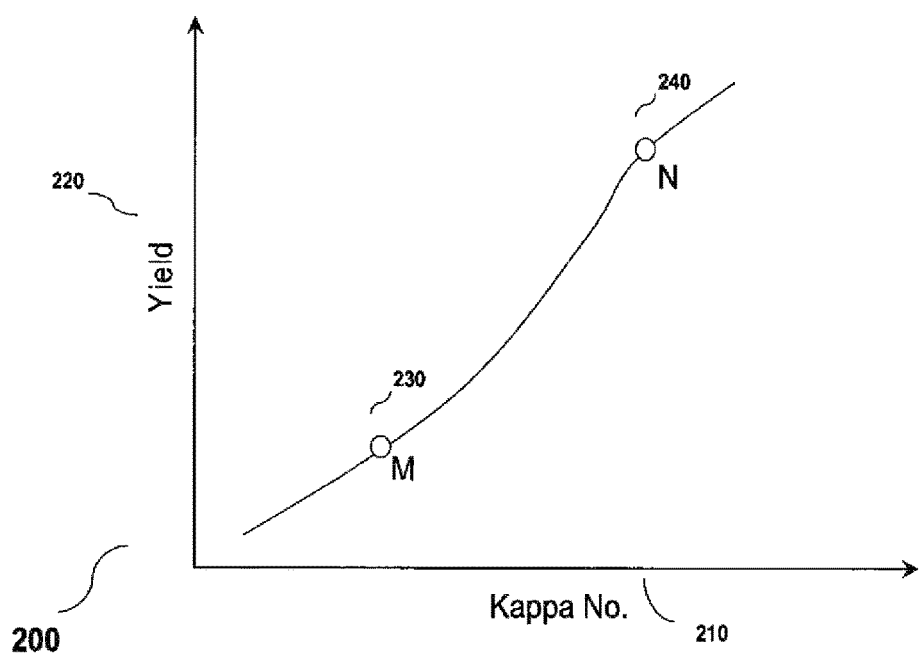
FIG. 2 is an exemplary multiobjective optimization solution for two objectives.

FIG. 2 illustrates an example of multiple solutions and formulation of a plant object function. In this example, a simple case of two objective functions is illustrated (i.e., the parameter objective functions are for minimization of Kappa number (210) and maximization of yield (220) subject to model constraints and bounds on important decision variables).

The optimal set of solutions obtained corresponding to this problem is indicated in FIG. 2. The curve represents multiple solutions that are obtained for this problem. All the solutions are better in either Kappa number or yield. Depending on the user specification, a given solution can be chosen and the set-point profile corresponding to this solution will be chosen for implementation (e.g., the points M (230) and N (240) in the curve are obtained as per the user specification for two different quality (grade) requirements of the pulp; i.e., for application in making storage boxes and high quality writing paper the specified quality of the pulp will differ significantly, captured through M and N as an example). Availability of different set point profiles for such varying specifications will facilitate better digester performance. With M as a chosen solution, corresponding to M a single objective optimization problem will involve minimization of Kappa number and equality constraint on yield corresponding to point M. The optimal profiles also need to be updated according to the change in the quality specifications of the pulp. Many more objective functions such as minimization of energy, effluents streams, etc., can also be considered together to get solutions in the multiple dimension objective function space.

Stochastic optimization algorithms can be used in solving multiobjective optimization and the time involved in solving such problems is large. Therefore, for on-line implementation, a single objective optimization problem corresponding to the desired optimal solution from the multidimensional objective space can be solved using a faster gradient based approach. An exemplary advantage here is that the initial guess which is specified for convergence of the gradient based methods can be provided by the solution to the multiobjective problem. Any optimization algorithms can be used to solve either of the optimization problems mentioned above if time involved for optimization is acceptable.

During on-line operation, the digester model predictions are likely to differ from the actual measurements of process parameters due to changes in the feed chip quality, changes in the composition of the cooking liquor, heat transfer coefficients in the heat exchangers, etc. In such a situation, model parameters can be re-estimated on-line using one or more process, quality and performance parameters. This is done by re-tuning model parameters to minimize the deviation between the plant and the model predictions of digester parameters. Nonlinear optimization techniques can be used to minimize the error. Periodic re-estimation of the model parameters can reduce the model mismatch and bring the model behavior closer to the real behavior of the continuous pulp digester.

As discussed earlier, the computational time involved for implementing the multiobjective optimization problem is large, and it may not be feasible to solve the multiobjective optimization problem with every update in the model parameters. Instead a single objective optimization problem can be solved to obtain better set-point profiles using the updated model. This optimization can be carried out using known gradient based methods like SQP and is faster to be suitable for on-line implementation.

The single objective optimization problem so formulated can be solved periodically using the updated model when there is significant deviation in the plant measurements and model predictions using the updated model. For major deviations in the plant measurements and model predictions using the updated model, the multiobjective optimization problem is solved.

Figure 3:
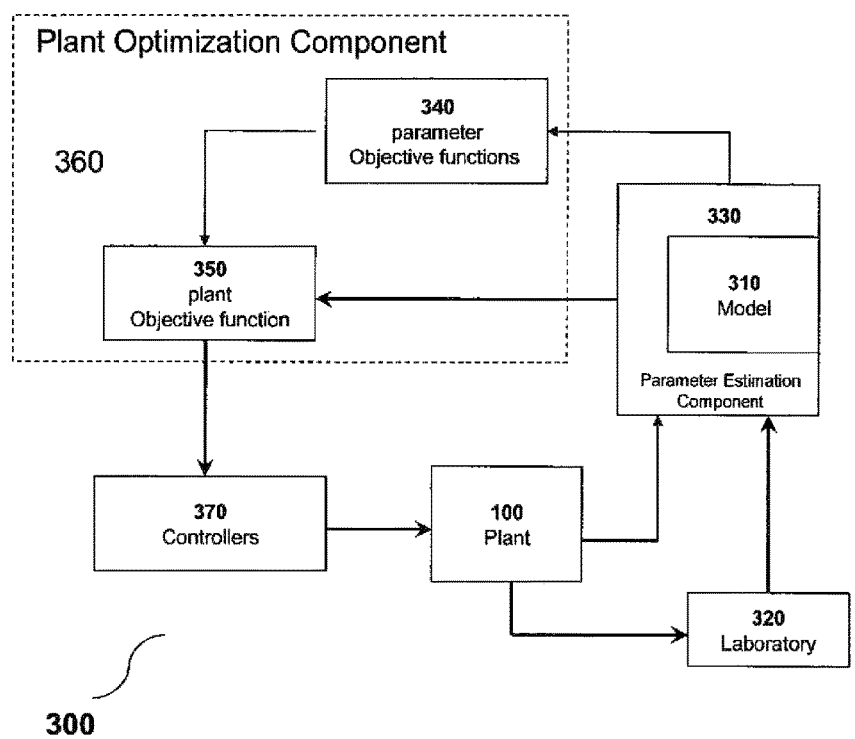
FIG. 3 is a schematic representation of an exemplary optimization of a continuous pulp digester as disclosed herein.

FIG. 3 is a schematic representation of an exemplary on-line optimization system (300) of a continuous digestion process as disclosed herein. The continuous pulp digester plant 100 has a process model 310 suitably updated based on the on-line measurement data, laboratory analysis (320) and estimation of unmeasured or unanalyzed parameters using a parameter estimation component (330). The parameter estimation component has various modules such as:

a) a prediction module to provide estimates of one or more digester parameters comprising (e.g., consisting of) model parameters, process parameters, quality and performance parameters, by using methods such as on-line measurement, data from laboratory analysis, mathematical formulation and/or any combinations thereof;

b) an update module to update a process model component based on the significance of any difference between the estimates of one or more digester parameters and the measured data obtained using methods such as on-line measurements, data from laboratory analysis and/or any combination thereof;

c) a trigger module to trigger an optimization solver to compute a plant objective function and parameter objective functions;

d) an interface support module to support a plant goal interface provide consequence and state information including plant trajectory information to help with the choice of a suitable plant objective function.

For optimization of the continuous pulp digester plant 100, multiobjective optimization functions 340 and the reduced single objective function 350 can be solved with optimization solver 360. As discussed earlier, the multiobjective functions are formulated to optimize various digester parameters and hence termed as parameter optimization functions. Similarly, the single objective function can be formulated to represent the plant objective and is termed as a plant optimization function. The output of the optimization solver 360 can be a set of set points for various digester parameters controlled through regulatory controller 370 (e.g., a computer or dedicated processor and/or firmware and/or software).

The optimization and model calculations can be implemented as a software application on any dedicated electronics or software means (e.g., a computer or dedicated processor and/or firmware and/or software) which can be a standard process automation system based on an object oriented approach to design and operate process automation systems.

It is to be noted that a modern DCS supports virtualization of various control system components and modules and a component or a module may have multiple instances of it running in the DCS system. For example, the plant optimization component may have two instances of plant objective functions running simultaneously in the DCS system.

The automation system can be programmed to update the model 310 and trigger the optimization solver 360 as can be found suitable for on-line operations by parameter estimation component 330. The parameter estimation component 330 determines the deviation and its significance between the values predicted by the model and the measurements made on-line or with the laboratory analysis. If the deviation is found significant, a trigger to the plant optimization component can be provided to have the objective functions including the multiobjective functions solved again. Such a trigger may occur during the start up phase while tuning the model or during any phase of the plant operation whenever for any reasons there is a need or desire to update the process plant model. The parameter estimation component 330 can also be a component that helps predict digester parameters to determine the consequence or state information as and when desired, for example, during the choice of a particular solution using the plant goal interface. This feature is extendable to provide plant consequence trajectory information to predict the course of plant operation with time using the model suitably.

Thus, exemplary schemes as proposed herein can provide on-line control of various digester parameters along the different sections of the digester for optimal control to achieve various plant objectives.

Various other modifications and alterations in the structure and method of operation of this invention will be apparent to those skilled in the art without departing from the scope and spirit of the invention. Although the invention has been described in connection with specific exemplary preferred embodiments and specifically for a continuous pulp digester used in paper and pulp industry, it should be understood that the invention as claimed should not be unduly limited to such specific embodiments or a particular plant system such as the continuous pulp digester used in paper and pulp industry. References to plurality of terms used herein in the specification also include its singular form and vice versa.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

REFERENCES

Nitin Padhiyar, Akhil Gupta, Abhishek Gautam, Sharad Bhartiya, Francis J. Doyle III, Sachi Dash, Sujit Gaikwad. Nonlinear inferential multi-rate control of Kappa number at multiple locations in a continuous pulp digester. Journal of Process Control, 16, 10, 2006, 1037-1053.

We claim:

1. A method for on-line optimization of a continuous pulp digester using a control system, wherein the control system comprises a plurality of controllers for a plurality of sections of the continuous pulp digester, an optimization solver for generating set points for digester parameters controlled through the plurality of controllers, and a trigger module to trigger the optimization solver, the method comprising, by the control system:

a) providing a model of the continuous pulp digester by a process model component, wherein the model of the continuous pulp digester is developed by connecting sub-models developed for the plurality of sections of the continuous pulp digester;

b) obtaining estimates of one or more digester parameters for the plurality of sections of the continuous pulp digester using a parameter estimation component;

c) obtaining measured data using at least one of on-line measurements, data from laboratory analysis, and any combination thereof;

d) obtaining a difference between the estimates of the one or more digester parameters and the measured data obtained using at least one of on-line measurements, data from laboratory analysis, and any combination thereof;

e) evaluating the difference between the estimates of the one or more digester parameters and the measured data based on allowed tolerances of on-line performance and accuracy of the continuous pulp digester;

f) providing a trigger to a plant optimization component to solve a plurality of multi-objective functions for optimization of the continuous pulp digester and to update the model of the continuous pulp digester based on the allowed tolerances;

g) obtaining multiple solutions by solving the plurality of multi-objective functions for optimizing various digester parameters, and obtaining consequence information using the updated model of the continuous pulp digester;

h) selecting a plant objective function from the plurality of multi-objective functions based on the obtained consequence information for each of the multiple solutions obtained using the updated model;
i) obtaining an optimal set-point profile for digester parameters along the plurality of sections of the digester, the optimal set-point profile being determined by solving the plant objective function; and
j) regulating the digester parameters by the plurality of controllers of the control system at the plurality of sections of the continuous pulp digester using the optimal set-point profile for optimized control of the continuous pulp digester.

2. The method as claimed in claim 1, further comprising, by the control system:
   a) obtaining constraint and bound information for the plurality of multi-objective functions except for the selected plant objective function, the constraint and bound information being defined using a plant goal interface; and
   b) optimizing the selected plant objective function under constraints imposed by the model or the constraint and bound information from the plant goal interface or both the constraints imposed by the model and the constraint and bound information from the plant goal interface, by manipulating the digester parameters to obtain optimal values of the plant objective function.

3. The method as claimed in claim 1, further comprising, by the control system:
   a)
   b) providing constraints and bounds for the digester parameters using a plant goal interface;
   c) defining one or more multi-objective functions with digester parameters from the parameter estimation component and the constraints and bounds from the plant goal interface; and
   d) optimizing the one or more multi-objective functions under constraints imposed by the model or the constraints and bounds from the plant goal interface or both the constraints imposed by the process model and the constraints and bounds from the plant goal interface, by manipulating the digester parameters to obtain one or more optimal values of the multi-objective functions.

* * * * *